United States Patent [19]

Miller

[11] Patent Number: 4,701,403

[45] Date of Patent: Oct. 20, 1987

[54] TWO-LAYER PROCESS FOR APPLYING ANTISTATIC COMPOSITIONS TO POLYESTER SUPPORTS

[75] Inventor: Conrad E. Miller, Hendersonville, N.C.

[73] Assignee: E. I. Du Pont de Nemours and Company, Wilmington, Del.

[21] Appl. No.: 875,251

[22] Filed: Jun. 17, 1986

Related U.S. Application Data

[63] Continuation of Ser. No. 691,768, Jan. 16, 1985, abandoned.

[51] Int. Cl.$^4$ .......................... G03C 1/82; B05D 3/04; B05D 3/10; B05D 3/02
[52] U.S. Cl. ................................. 430/529; 430/527; 430/532; 430/625; 430/935; 427/307; 427/314; 427/322; 427/337; 427/340

[58] Field of Search .............. 430/527, 529, 935, 625; 427/307, 314, 322, 337, 340

[56] References Cited

U.S. PATENT DOCUMENTS

| | | | |
|---|---|---|---|
| 3,704,167 | 11/1972 | Yamamoto et al. | 430/935 |
| 4,175,970 | 11/1979 | Le Strange | 430/529 |
| 4,218,533 | 8/1980 | Fuchigami et al. | 430/935 |
| 4,225,665 | 9/1980 | Schadt | 430/529 |
| 4,241,169 | 12/1980 | Work et al. | 430/625 |
| 4,241,171 | 12/1980 | Clapp et al. | 430/935 |
| 4,301,239 | 11/1981 | Miller | 430/510 |

Primary Examiner—Richard L. Schilling

[57] ABSTRACT

An improved antistatic coating for a polyester support bearing a photographic layer is applied in two coatings using conventional coating equipment. The first coating contains an electrically conductive polymer and optionally a binding agent; the second coating contains a crosslinking agent.

16 Claims, 1 Drawing Figure

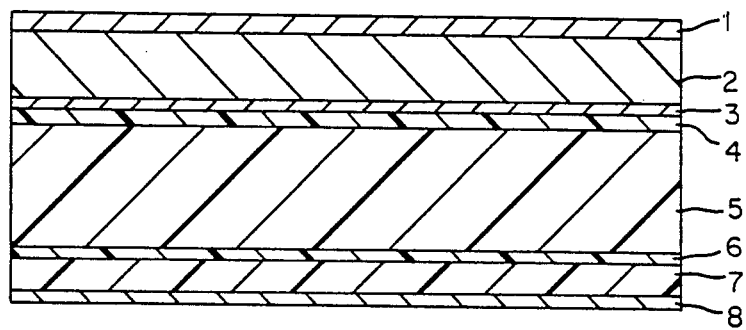

TWO-LAYER PROCESS FOR APPLYING ANTISTATIC COMPOSITIONS TO POLYESTER SUPPORTS

This application is a continuation of application Ser. No. 691,768 filed Jan. 16, 1985, now abandoned.

BACKGROUND OF THE INVENTION

1. Field of the Invention

This invention relates to the field of antistatic compositions suitable for application to polymeric materials, and particularly relates to the application of a thin antistatic composition to the surface of a polyester support for photographic films.

2. Background Art

Due to their high dielectric constant it is a common characteristic of many polymeric articles to build up static charges when moving in contact with surfaces of similarly high dielectric constant. Films, sheets, and rolls used as elements and supports for photographic applications are required to undergo increased relative motion as a result of automation and higher speed production techniques.

While static discharge has been a continuing problem with such insulating structures, the problems associated with photographic films are amplified because highly sensitive recording media (e.g. silver halide emulsions) are coated on the supports. In fact, very high speed photographic emulsions are capable of detecting light generated by static discharge which is not visible to the naked eye or easily detected by simple instrumentation. In addition, where films are used in rolls or reels which must be mechanically wound and unwound and used for duplication, i.e., microfilm or medical recording film used to store and later reproduce information, small dirt particles clinging to the surface due to static attraction will be magnified in enlargements. Thus, because static-related damage may result after, as well as before, the photosensitive element has been exposed and developed, it is desirable to provide antistatic protection which survives such processing.

Several methods are known for protecting photographic materials from the adverse effects of static.

Matting agents or particulates, i.e., beads or spheres in photographic coatings, can physically separate the film from the roller or plate. This approach has the disadvantage of creating haze, and the particulates may become dislodged and cause dust and dirt problems, which is unacceptable for high quality film uses.

Hygroscopic materials can prevent static by overcoming the low moisture conditions conducive to static, but have the undesirable effect of causing sheets or films to stick together to stick to other surfaces.

Electroconductive polymers can be incorporated into a layer to provide static protection by preventing the static buildup through electrical conductivity. A common problem with these is that they are not permanent to photographic processing solutions and some are not transparent when coated in admixture with conventional binders.

U.S. Pat. No. 4,225,665, Schadt, incorporated herein by reference, describes an antistatic layer comprising a mixture of a water-soluble, electrically conductive polymer having functionally attached carboxylic groups integral or incorporated therein, a hydrophobic polymer binder, and a polyfunctional aziridine crosslinking agent. This composition is coated over a resin-subbed (subcoated) polyester support to give antistatic protection thereto. The trouble with this system is that mixing of the crosslinking agent and the other components prior to coating causes untold problems. Premature reactions occur that plug the coating equipment, and thick layers must be applied in order to achieve good antistatic protection. This is a costly system and thicker layers also have other problems such as increased haze.

SUMMARY OF THE INVENTION

It is an object of this invention to provide an improved antistatic layer for a polymeric shaped article, and more particularly for a polymeric film useful as a photographic film. A more specific object of this invention is to provide an antistatic layer such that it can be applied at a low coating weight using conventional coating equipment.

These and other objects are achieved in a process wherein a polymeric shaped article is coated with an antistatic layer comprising:

(1) a water-soluble, electrically conductive polymer having functionally attached carboxylic groups integral to the polymer or incorporated therein by chemical means such as copolymerization, (2) optionally a hydrophobic polymer binder containing carboxyl groups, and (3) a polyfunctional aziridine, the improvement comprising coating an admixture of (1) and (2) as a first coating, drying said first coating, and then applying (3) from an aqueous solution contiguous to said first coating, followed by drying.

The process described above produces a thin, defect-free (e.g. haze-free) element that is eminently suitable for providing permanent, clear antistatic backings for photographic elements coated on polyethylene terephthalate supports, for example. Because the crosslinking agent is applied as a separate coating, pre-mixing of all the components is avoided and premature reaction products are nonexistent.

DESCRIPTION OF THE DRAWING

The drawing illustrates, in cross-section, a typical photographic film employing an antistatic layer applied according to the process of this invention. In this drawing, layer 1 is an antiabrasion layer coated over a typical photographic layer 2, supported on gel sub layer 3, resin sub layer 4, and film support 5, and another resin sub layer 6. Layer 7 represents the coating containing the electrically conductive polymer and, optionally, a polymer binder while layer 8 represents a coating of the crosslinking agent (e.g. a polyfunctional aziridine).

DETAILED DESCRIPTION OF THE INVENTION

The advantages of this invention over the prior art are many. By separating the polyfunctional aziridine from the other ingredients, premature crosslinking of the electrically conductive polymer and, optionally, the hydrophobic polymer, is eliminated. This is an important advantage since solids caused by this premature crosslinking tend to plug and foul the coating equipment, causing untold complications. Additionally, one may cost without the hydrophobic polymer using this process, thus saving ingredient cost. Also, the coating weight of the antistatic layer of the invention can be lowered significantly over the prior art; yet properties such as clarity, adhesion, antistatic effects, etc. are all maintained.

Particularly preferred for (1) is a copolymer of the sodium salt of styrene sulfonic acid with maleic acid in a 3:1 mole ratio, while (2) is a multicomponent anionic copolymer of methacrylic acid and one or more monomers of the group consisting of alkyl acrylates, styrene, acrylonitrile, and alkyl methacrylates, and wherein a suspending surfactant, if required, is also anionic or nonionic; and (3) is a polyfunctional aziridine capable of forming a three-dimensional structure interlinking the support with both the electrically conductive polymer and the hydrophobic polymer. (1) can be used in a range of 35–100 parts by weight, (2) 65–0 parts by weight, and (3) 2.5 to 30.0 parts by weight. Preferably, an aqueous solution of (1) is coated on a conventionally resin-subbed polyester film support followed by an aqueous coating of (3) to give a ratio of 100/10 parts by weight, respectively. Alternately, an aqueous mixture of (1) and (2) is coated, followed by a coating of an aqueous solution of (3), to give a ratio of 66/34/10 parts by weight, respectively. Total coating weights can range from 1.5 to 6.0 mg/dm$^2$ with a preferred coating weight of about 3.0 mg/dm$^2$.

After the composition of this invention is coated on the support, the critical crosslinking (curing) occurs during the drying of the layer, thereby transforming this composition into its useful form as a permanent antistatic layer which is both water resistant and transparent. Air temperatures of from 40° C. to 200° C. are useful for the drying-curing step, while the preferred range is 60° C. to 140° C.

It is preferable to apply, and dry-cure, the antistatic layer during the manufacture of the polyester support as taught by Alles in U.S. Pat. No. 2,779,684, and to apply a resin subbing layer such as the mixed polymer subbing compositions of vinylidene chloride-itaconic acid, taught by Rawlins in U.S. Pat. No. 3,567,452, prior to the application of the antistatic layer. When polyethylene terephthalate is manufactured for use as a photographic support, the polymer is cast as a film, the mixed polymer subbing composition of Rawlins is applied and the structure is then biaxially stretched, followed by application of a gelatin subbing layer. Upon completion of stretching and the application of subbing compositions, it is necessary to remove strain and tension in the base by a heat treatment comparable to the annealing of glass. Air temperatures of from 100° C. to 160° C. are typically used for this heat treatment, which is referred to as the post-stretch heat relax. If desired, one or both of the gelatin subbing layers could be replaced by the formulation of the present invention and thus, the facilities and heat treatment involved in base manufacturing, when used for the application and drying-curing of the present invention, serve a dual purpose and result in an increase in productivity and economy.

In a preferred embodiment the electrically conductive, antistatic polymer comprises a copolymer of the sodium salt of styrene sulfonic acid and maleic acid in a 3:1 molar ratio having a molecular weight of about 5000. The low molecular weight is desirable to insure water solubility and to obtain transparent and haze-free coatings. The higher amount of the electrically conductive sodium salt of styrene sulfonic acid in relation to the carboxylate unit serves to balance the requirement for antistatic protection with sufficient capability of the copolymer to become permanently attached to the hydrophobic polymer and/or other antistatic polymers, as well as the support, via these carboxylic groups.

Hydrophobic polymers used in the present invention include those with molecular weights ranging from 20,000 to over 1,000,000. One group of high molecular weight polymers is made up of copolymers of 40 to 45% styrene, 40 to 45% butyl methacrylate, 0 to 10% butyl acrylate, and 4 to 18% methacrylic acid, prepared by emulsion polymerization in the presence of a noncationic surfactant. Another group of high molecular weight polymers is made up of copolymers of 40 to 45% butyl methacrylate, 40 to 45% acrylonitrile, and 10 to 20% methacrylic acid, emulsion-polymerized in the presence of a noncationic surfactant. One group of lower molecular weight polymers comprises copolymers of 36 to 90% methyl methacrylate, 5 to 50% ethyl acrylate, and 5 to 16% methacrylic acid, prepared by emulsion polymerization in the presence of sodium lauryl sulfonate, which is an anionic surfactant.

Other anionic surfactants suitable for preparing and suspending the hydrophobic latex of the present invention in addition to sodium lauryl sulfonate are dioctyl sodium sulfosuccinate, sodium octyl phenyl polyether sulfonate, and other sodium alkyl aryl polyether sulfonates. Since it is usual practice to use a large quantity of surfactant during emulsion polymerization of commercial latex dispersions, it is usually unnecessary to add additional surfactant.

The preferred polyfunctional aziridine crosslinking agent is pentaerythritol-tri-[β-(N-aziridinyl)propionate]:

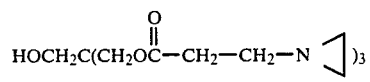

It is a soluble clear, amber liquid having an aziridine content of 6.76 milliequivalents per gram and an aziridine functionally of 2.76. Other polyfunctional aziridine hardeners can also be used such as trimethylol propane-tri-[β-(N-aziridinyl)propionate]:

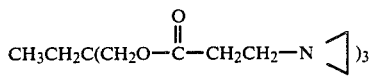

and trimethylol propane-tri-[β-(N-(methylaziridinyl))-propionate]:

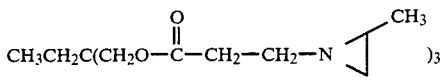

Other polyfunctional aziridines could be employed as long as at least two crosslinking groups are contained in each molecule.

The aqueous coating compositions may be applied to any suitable photographic support, but the preferred support is polyethylene terephthalate which has been subcoated with a layer of resin, or layers of resin and gelatin. Alternatively, the coating composition of this invention, which when coated make up the antistatic layer, may be applied to an unsubbed polyester support that has been energy treated (e.g. by electrostatic charge or spark, flame or chemical treatment such as is conventional in the prior art; see particularly U.S. Pat. Nos. 2,493,937, 3,072,483, 3,607,818, 3,753,765 and Canadian Pat. No. 684,658.)

A backing layer is the preferred location for the hydrophobic antistatic composition of the present invention when used for photographic films or rolls. However, other specific applications may require that antistatic protection be provided above or beneath a photosensitive layer. When used in conjunction with other photosensitive and auxiliary layers it may be necessary to have intermediate layers to provide compatibility and provide sufficient adhesion to adjacent layers. Thus, while the antistatic composition of the present invention can be applied satisfactorily to a resin or gelatin subbing layer or an energy-treated surface, it may be necessary to coat a gelatin layer in preparation for the application of a gelatino-silver halide emulsion coating.

The photosensitive and/or radiation sensitive layers useful with the present invention may be any which are well-known for imaging and reproduction in fields such as graphic arts, printing, medical, and information systems. Photopolymer, diazo, vesicular image-forming compositions and other systems may be used in addition to silver halide. Photographic silver halide emulsions may be of varied content and be negative and/or positive working. The response of the silver halide may be enhanced and stabilized by such chemical agents as boranes, amines, polyethylene oxides, tetrazaindenes, benzotriazole, alkali halides, phenyl mercaptotetrazole, and gold, mercury, and sulfur compounds. Dyes, development modifiers, covering power polymers, surfactants, lattices, hardeners, and other addenda known in the photographic art may also be employed with the photographic silver halide emulsion.

The antistatic layer of the present invention may also contain addenda which do not degrade the antistatic properties. Typical are matting agents, plasticizers, lubricants, surfactants, dyes, and haze reducing agents.

While it is obvious that, when the composition of the present invention is used on an opaque support, it is not necessary to obtain a haze-free coating, the preferred mode of the invention results in more universally useful clear coatings. The antistatic polymer with carboxyl groups, the hydrophobic polymer, and the stabilizing surfactant, if needed, are all of the same charge type, anionic or nonionic (surfactant), so as to allow cross-linking without the incompatibility which could occur if cationic and anionic elements were mixed together.

Details of the measurements of surface resistivities for photographic films may be found in Nadeau et al, U.S. Pat. No. 2,801,191; and Amey et al, American Society for Testing Materials Proceedings, Vol. 49, 1079-1091 (1949), which provide the details of the surface resistivity measurements of this application. While surface resistivity was used extensively in evaluating the present invention, a dynamic measure was also made by electronically counting the static discharges as film samples were transported through an apparatus simulating a microfilm camera containing rollers known for high levels of static generation. Both static and dynamic tests were run under controlled humidity conditions, since otherwise the test results would not be comparable due to the variation in static propensity with changes in humidity.

Specific viscosity of antistatic polymers was measured at room temperature using a 1% polymer solution in distilled water adjusted to pH 9.0 with aqueous ammonia and using a Cannon-Fenske viscometer.

Determination of the amount of antistatic composition which has been applied to the base or support may be carried out by a simple gravimetric method. A dry sample of known area is weighed and the antistatic layer is then removed by rubbing with a household with water and ethanol the sample is dried and weighed. The weight loss divided by the sample area gives the coating weight per unit area. It is also possible to determine coating weights by measuring the amount of coating solution consumed for a given area of coated surface. Knowing the amount of solid in the coating solution, it is possible to divide this weight by the area coated and obtain the approximate coating weight per unit area. One other method, which is useful only in terms of calibration, is to add a dye to the coating solution in order to obtain a relationship between optical density and coating weight. Since optical density is a quick measurement and can be run even with a wet sample, it is possible to quickly adjust parameters to obtain the optical density corresponding to the desired coating weight.

Once conditions are correct, coating solutions of the same percent solids can be used without the dye addition to give the desired transparent coatings of the present invention.

The permanent nature of the antistatic layer of the present invention makes it particularly beneficial for use with photographic films which are coated and stored in roll form since adverse effects from diffusion of unbound components out of the antistatic layer into the emulsion layer can be reduced substantially or eliminated. Sensitometric tests show no deleterious results when films made by the present invention are compared with those having only a subbing and/or gelatin coating.

For the preferred antistatic copolymer, the ratio of sodium salt of styrene sulfonic acid to maleic acid is 3:1 (molar), or on a weight ratio basis, 79:21. Other antistatic copolymer weight ratios of from 95:5 to 2:3 will also give the desired permanent antistatic protection of the present invention, provided that the antistatic monomer unit is present in an amount equal to or greater than 35 parts on a weight ratio basis.

This invention will now be illustrated by the following specific examples of which No. 4 of Example I is considered the best mode.

EXAMPLE 1

In order to compare the process of this invention with the process described in the prior art (Schadt, U.S. Pat. No. 4,225,665) solutions with the following ingredients were prepared:

| Solution No. | Deionized Water | Ingredients (Wt. in gms.) Electrically Conductive Polymers[1] | Terpolymer Binder[2] | Surfactant[3] | Cross-linker[4] |
|---|---|---|---|---|---|
| 1 | 3307 | 222 | 69 | 2 | 0 |
| 2 | 3181 | 317 | 0 | 2 | 0 |
| 3 | 3016 | 444 | 138 | 2 | 0 |
| 4 | 2964 | 634 | 0 | 2 | 0 |
| 5 | 3299 | 222 | 69 | 2 | 0 |
| 6 | 3000 | 444 | 138 | 2 | 16 |
| 7 | 3173 | 317 | 0 | 2 | 8 |
| 8 | 2948 | 634 | 0 | 2 | 16 |
| 9 | 3600 | 0 | 0 | 0 | 8 |

-continued

| Solution No. | Deionized Water | Ingredients (Wt. in gms.) Electrically Conductive Polymers[1] | Terpolymer Binder[2] | Surfactant[3] | Crosslinker[4] |
|---|---|---|---|---|---|
| 10 | 3600 | 0 | 0 | 0 | 16 |

[1] poly(sodium styrene sulfonate maleic anhydride), 3:1 copolymer, M.W. 5,000, 25% in water.
[2] poly(styrene:butylmethacrylate:butylacrylate:methacrylic acid), 45:43:8:4 terpolymer, 41.5% in water.
[3] Fluorosurfactant (FC-128 ®, 3M) 50% in water-ethanol-isopropanol; Formula:

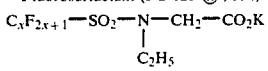

[4] pentaerythritol-tri-[β-(N—aziridinyl)-propionate], a trifunctional aziridine of the following formula:

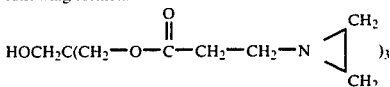

Coatings made using the process of this invention were as follows:

A-1: Coat solution 1 on resin-subbed 4 mil poly(ethylene terephthalate) film support using a roll fitted pan, an air knife coater (5 inches water air knife pressure), 200 fpm web speed, and 70° C. drier temperature. Overcoat the dried coating with solution 9 at the same coating conditions.
A-2: Coat solution 2 per above and overcoat with solution 9.
A-3: Coat solution 3 per above and overcoat with solution 10.
A-4: Coat solution 4 per above and overcoat with solution 10.

The following coatings are representative of the prior art:

A-5: Coat solution 5 per above-no overcoat.
A-6: Coat solution 6 per above-no overcoat.
A-7: Coat solution 7 per above-no overcoat.
A-8: Coat solution 8 per above-no overcoat.

Samples from all of the above coatings were then heat relaxed at 145° C., 45 fpm by passing through the coater again. An analysis of the coatings showed the following:

| | COMPOSITION (PARTS BY WT.) | | | | |
|---|---|---|---|---|---|
| Coating | Elect. Cond. Polymer | Terpolymer Binder | Crosslinker | Coat. Wt. (mg/dm²) | Type |
| A-1 | 60 | 31 | 9 | 2 | * |
| A-2 | 91 | 0 | 9 | 2 | * |
| A-3 | 60 | 31 | 9 | 4 | * |
| A-4 | 91 | 0 | 9 | 4 | * |
| A-5 | 60 | 31 | 9 | 2 | ** |
| A-6 | 60 | 31 | 9 | 4 | ** |
| A-7 | 91 | 0 | 9 | 2 | ** |
| A-8 | 91 | 0 | 4 | 4 | ** |

*of this invention
**prior art

Each of the above coatings were tested for physical and electrical permanence by rubbing a 4-5 inch diameter area in a circular pattern with a water saturated tissue. Each sample was rubbed ten times and then the area blotted dry with another tissue.

Coatings A-1 through A-4 showed no physical damage by the test treatment while coatings on samples A-5 through A-8 were entirely or partially removed. This demonstrates that coatings made by the process of this invention are highly crosslinked and have superior physical integrity.

Surface resistivity measurements made before and after the test treatment show the electrical conductivity of the coatings of this invention are more permanent than those made by the prior art process.

| Coating Number | Surface Resistivity* (OHMS/Sq.) | |
|---|---|---|
| | Before Test | After Test |
| A-1 | $1.3 \times 10^9$ | $2.4 \times 10^9$ |
| A-2 | $1.1 \times 10^9$ | $7.2 \times 10^8$ |
| A-3 | $1.5 \times 10^9$ | $5.4 \times 10^8$ |
| A-4 | $8.6 \times 10^9$ | $4.9 \times 10^8$ |
| A-5 | $1.5 \times 10^9$ | $5.7 \times 10^{12}$ |
| A-6 | $4.6 \times 10^8$ | $7.9 \times 10^{11}$ |
| A-7 | $7.9 \times 10^8$ | $6.2 \times 10^{11}$ |
| A-8 | $1.9 \text{ E } 10^9$ | $2.4 \times 10^{12}$ |

*Resistivity Measured with 500 V, 55% R.H. 73° F.

EXAMPLE 2

In order to test the process of this solution using an energy-treated film support, the following solutions were prepared:

| Solution No. | Deionized Water | Ingredients (Wt. in gms.) Electrically Conductive Polymers (See Ex. 1) | Terpolymer Binder (See Ex. 1) | Surfactant (See Ex. 1) | Crosslinker (See Ex. 1) |
|---|---|---|---|---|---|
| 1 | 3181 | 317 | 0 | 2 | 0 |
| 2 | 3387 | 222 | 69 | 2 | 0 |
| 3 | 2964 | 634 | 0 | 2 | 0 |
| 4 | 3016 | 444 | 138 | 2 | 0 |
| 5 | 3600 | 0 | 0 | 0 | 8 |
| 6 | 3600 | 0 | 0 | 0 | 16 |

Samples of solutions 1-4 were coated on both flame-treated 4 mil polyethylene terephthalate film base and nonsubbed nontreated base in the coater of Example 1 at 200 fpm, 5 inches water air knife pressure, and 80° C. drier temperature. Coatings made with solutions 1 and 2 were then overcoated with solution 5, and coatings made with solutions 3 and 4 overcoated with solution 6. Coatings made on the nonsubbed nontreated base were labelled A and those on the flame-treated base as B. Each had the following composition:

| | COMPOSITION (PARTS BY WT.) | | | | |
|---|---|---|---|---|---|
| Coating | Elect. Cond. Polymer | Terpolymer Binder | Crosslinker | Coat. Wt. (mg/dm²) | Treatment |
| 1A | 91 | 0 | 9 | 2 | None |
| 2A | 60 | 31 | 9 | 2 | None |
| 3A | 91 | 0 | 9 | 4 | None |
| 4A | 60 | 31 | 9 | 4 | None |
| 1B | 91 | 0 | 9 | 2 | Flame |
| 2B | 60 | 31 | 9 | 2 | Flame |
| 3B | 91 | 0 | 9 | 4 | Flame |
| 4B | 60 | 31 | 9 | 4 | Flame |

Each of the above coatings was tested for physical and electrical permanence by rubbing with a water-saturated tissue as described in Example 1. None of the coatings showed any physical damage which demonstrates the coatings have good wet anchorage.

Dry anchorage was checked as follows:

1. Scribe 1/4"×1/4" square hatch marks in coating with a razor blade.
2. Place a 1" sample of No. 600 Scotch Brand Tape (3M Co., Minneapolis, MN) over the scribed areas and rub to insure complete contact.
3. Pull tape quickly from surface at about 30° with an even pull.
4. Count number of squares and partial squares removed.

All samples tested had good dry anchorage.

Surface resistivity measurements made before and after the wet anchorage treatment show some conductivity was lost during the treatment but the coatings are still conductive enough to afford good static protection as shown below:

| Coating Number | Surface Resistivity (OHMS/Sq.)* Before Test | After Test | Base Treatment |
|---|---|---|---|
| 1A | $7.4 \times 10^8$ | $2.7 \times 10^9$ | None |
| 2A | $2.7 \times 10^9$ | $2.4 \times 10^{10}$ | None |
| 3A | $4.2 \times 10^8$ | $1.1 \times 10^9$ | None |
| 4A | $8.1 \times 10^8$ | $5.1 \times 10^9$ | None |
| 1B | $7.9 \times 10^8$ | $1.3 \times 10^{10}$ | Flame |
| 2B | $1.8 \times 10^9$ | $7.6 \times 10^{10}$ | Flame |
| 3B | $4.0 \times 10^8$ | $9.5 \times 10^8$ | Flame |
| 4B | $7.2 \times 10^8$ | $3.3 \times 10^9$ | Flame |

*Measured with 500 V at 57% R.N. 72° F.

Surface resistivity measurements made before and after samples were soaked in 40° C. $H_2O$ for 5 minutes also show the coatings have good electrical permanence.

| Coating Number | Surface Resistivity* (OHMS/Sq.) After 5 min. soak in 40° C. $H_2O$ |
|---|---|
| 1A | $5.8 \times 10^8$ |
| 2A | $2.1 \times 10^9$ |
| 3A | $2.9 \times 10^8$ |
| 4A | $8.1 \times 10^9$ |
| 1B | $1.3 \times 10^9$ |
| 2B | $2.7 \times 10^9$ |
| 3B | $3.5 \times 10^8$ |
| 4B | $7.2 \times 10^8$ |

*Measured at 55% R.H. 73° F. with 500 V

EXAMPLE 3

In order to test alternative binder levels and binders, aqueous solutions were made up as previously described and coated on resin-subbed film to yield coatings of the following compositions:

| Coating | Electrically Cond. Polymer (See Ex. 1) | Terpolymer Binder (See Ex. 1) | Gelatin | Cross-linker (See Ex. 1) |
|---|---|---|---|---|
| 1 | 45 | 55 | 0 | 6 |
| 2 | 36 | 64 | 0 | 6 |
| 3 | 75 | 0 | 25 | 6 |
| 4 | 60 | 0 | 40 | 6 |
| 5 | 63 | 0 | 37 | 6 |

The crosslinking agent was applied over the dried coating of the electrically conductive polymer and the terpolymer or gelatin binder in the manner of the process of this invention. Samples from each coating were tested for reactivity to static before and after soaking in water or 3N KOH for 5 minutes at room temperature. In all cases resistivity was considered good. Haze was also measured and found to be excellent.

EXAMPLE 4

In the same manner as Example 3 coatings were made with the following compositions:

| Coating | Electrically Cond. Polymer (See Ex. 1) | Terpolymer Binder (See Ex. 1) | Gelatin Binder | Cross-linker (See Ex. 1) |
|---|---|---|---|---|
| 1 | 45 | 55 | 0 | 6 |
| 2 | 36 | 64 | 0 | 6 |
| 3 | 85 | 0 | 15 | 6 |
| 4 | 100 | 0 | 0 | 6 |

The crosslinking agent was applied over the dried coating of the electrically conductive polymer and the terpolymer or gelatin binder in the manner of the process of this invention. Samples from each coating were tested as described in Example 3. Haze and resistivity was considered good to excellent in all cases.

EXAMPLE 5

To test the efficacy of yet other binders within the process of this invention, aqueous solutions of the ingredients listed below were coated on resin-subbed polyester film to yield coatings with the following compositions:

| Coating | Electrically Cond. Polymer (See Ex. 1) | Binder | Cross-linker (See Ex. 1) |
|---|---|---|---|
| 1 | 50 | $A^{(1)}$-50 | 6 |
| 2 | 50 | $B^{(2)}$-50 | 6 |
| 3 | 50 | $C^{(3)}$-50 | 6 |
| 4 | 50 | $4^{(4)}$-50 | 6 |

A = polyvinyl acetate copolymer, Polyco2186, Borden Chem. Co.
B = methylmethacrylate:butyl acrylate:hydroxyethyl acrylate:methacrylic acid (40:40:15:5)
C = methylmethacrylate:ethyl acrylate:hydroxyethyl acrylate: (46:40:9:5)
D = methylmethacrylate:ethyl acrylate:hydroxyethyl acrylate:methacrylic acid (28:52:15:5)

The crosslinking agent was applied over the dried coating of the electrically conductive polymer and the binder indicated, in the manner of this invention. Samples from either coating were tested for resistivity as well as resistance to aqueous caustic soln. (5% KOH) and for haze. All results were good to excellent.

EXAMPLE 6

To test the effect of mixed binder, aqueous solutions of the various components were coated as resin-subbed polyester films to yield coatings with the following compositions:

| Coating | Electrically Cond. Polymer (See Ex. 1) | Ter-polymer Binder (See Ex. 1) | Poly-vinyl Alcohol | Poly-acryl-amide | Cross-linker (See Ex. 1) |
|---|---|---|---|---|---|
| 1 | 66 | 34 | 0 | 0 | 6 |
| 2 | 66 | 34 | 0 | 0 | 6 |
| 3 | 65 | 31 | 3 | 0 | 6 |
| 4 | 65 | 28 | 7 | 0 | 6 |
| 5 | 66 | 17 | 17 | 0 | 6 |
| 6 | 65 | 28 | 0 | 7 | 6 |
| 7 | 65 | 31 | 0 | 3 | 6 |

As described before, the crosslinking agent was applied to the dried coating containing the electrically conductive polymer and the binding agents shown above. Resistivity, haze, and aqueous resistance were tested with good results in all cases.

I claim:

1. In a process wherein a polymeric shaped article is coated with an antistatic layer comprising:
   (1) a water-soluble, electrically conductive polymer having functionally attached carboxylic acid groups integral to the polymer or incorporated therein by copolymerization; and
   (2) a polyfunctional aziridine, the improvement comprising coating (1) as a first coating, drying said first coating, and then applying (2) from an aqueous solution contiguous to said first coating, followed by drying the total coating weights ranging from 1.5 to 4.0 mg/dm$^2$.

2. The process of claim 1 wherein the first coating contains in addition to the water-soluble electrically conductive polymer (1) a hydrophobic polymer binder containing carboxyl groups (3).

3. The process of claim 1 wherein an aqueous solution of (1) is coated on a resin-subbed polyester film support, followed by applying an aqueous coating of (2) to give a ratio of 100/10 parts by weight, respectively.

4. The process of claim 2 wherein an aqueous mixture of (1) and (3) is coated, followed by a coating of an aqueous solution of (2) to give a ratio of 66/34/10 parts by weight, respectively.

5. The process of claim 1 wherein total coating weights range from 1.5 to about 3.0 mg/dm$^2$.

6. The process of claim 1 wherein, after the support is coated with said antistatic layer, crosslinking occurs during the drying of the layer, whereby the antistatic layer is rendered both water resistant and transparent.

7. The process of claim 6 wherein temperatures of from 40° C. to 200° C. are employed for the drying step.

8. The process of claim 1 wherein the polymeric shaped article is polyethylene terephthalate which has been subcoated with a layer of resin, or layers of resin and gelatin.

9. The process of claim 1 wherein the polymeric shaped article is an unsubbed polyester support that has been energy treated by electrostatic charge or spark, flame or chemical treatment.

10. A process of forming a photographic film wherein the coated shaped article formed by the process of claim 1 is further coated with a gelatino-silver halide emulsion.

11. The process of claim 2 wherein component (1) is a copolymer of the sodium salt of styrene sulfonic acid with maleic acid in a 3:1 mole ratio; (3) is a multicomponent anionic copolymer of methacrylic acid and one or more monomers of the group consisting of alkyl acrylates, styrene, acrylonitrile, and alkyl methacrylates, and optionally includes an anionic or nonionic suspending surfactant; and (2) is a polyfunctional aziridine capable of forming a three-dimensional structure interlinking the support with both the electrically conductive polymer and the hydrophobic polymer.

12. The process of claim 11 wherein copolymer component (1) has a molecular weight of about 5000.

13. The process of claim 11 wherein component (3) is a high molecular weight copolymer of 40–45% styrene, 40–45% butyl methacrylate, 0–10% butyl acrylate, and 4–18% methacrylic acid.

14. The process of claim 11 wherein component (3) is a high molecular weight copolymer of 40–45% butyl methacrylate, 40–45% acrylonitrile, and 10–20% methacrylic acid.

15. The process of claim 11 wherein component (3) is a copolymer of 36–90% methylmethacrylic, 5–50% ethyl acrylate, and 5–16% methacrylic acid.

16. The process of claim 2 wherein component (1) is employed in a range of 35–100 parts by weight, (3) 65–0 parts by weight, and (2) 2.5 to 30.0 parts by weight.

* * * * *